US006690426B1

(12) United States Patent
Kim

(10) Patent No.: US 6,690,426 B1
(45) Date of Patent: Feb. 10, 2004

(54) APPARATUS AND METHOD FOR CONVERTING FROM PROGRESSIVE SCANNING IMAGE TO INTERLACE SCANNING IMAGE

(75) Inventor: Sung-Soo Kim, Kyungki-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 381 days.

(21) Appl. No.: 09/641,970

(22) Filed: Aug. 21, 2000

(30) Foreign Application Priority Data

Aug. 23, 1999 (KR) ........................................ 1999-34885

(51) Int. Cl.[7] .................................................. H04N 7/01
(52) U.S. Cl. ........................ 348/446; 348/441; 348/458
(58) Field of Search ................................ 348/446, 458, 348/441, 447, 910; H04N 7/01

(56) References Cited

U.S. PATENT DOCUMENTS 5,936,675 A * 8/1999 Zhang et al. ............... 348/446
5,963,261 A * 10/1999 Dean .......................... 348/446
5,990,965 A * 11/1999 Herz et al. .................. 348/446
6,094,226 A * 7/2000 Ke et al. .................... 348/446
6,144,412 A * 11/2000 Hirano et al. ............... 348/441

* cited by examiner

*Primary Examiner*—Michael H. Lee
*Assistant Examiner*—Trang U. Tran
(74) *Attorney, Agent, or Firm*—Sughrue Mion, PLLC

(57) ABSTRACT

The present invention relates to an apparatus and method for converting scanning mode. The apparatus of the present invention for converting an image signal of a progressive scanning mode to an image signal of an interlace scanning mode includes a line-memory part to store a first line signal inputted at present and a converted first line signal among image signals of said progressive scanning mode selectively in response to a first control signal, a line synthesizing part outputting a converted first line signal by synthesizing said first line signal inputted at present and a previously inputted first line signal stored in said line-memory part in response to a first and a second synthesizing coefficient value, an output part outputting said converted first line signal in response to a second control signal and a control part controlling by providing said first and second control signal established in response to the number of lines of an image signal of said progressive scanning mode and to the number of lines of an image signal of an interlace scanning mode and said synthesizing coefficient value to said each part. Therefore, according to the present invention, a screen flickering phenomenon can be eliminated effectively using one line-memory, in converting a progressive scanning image to an interlace scanning image.

8 Claims, 6 Drawing Sheets

FIG.3

| CONTROL SIGNAL | | S1 | S2 | S3 | S4 |
|---|---|---|---|---|---|
| TOP FIELD | 0 | 0 | – | – | 0 |
| | 1 | 0 | 4/8 | 4/8 | 1 |
| BOTTOM FIELD | 0 | 0 | 4/8 | 4/8 | 1 |
| | 1 | 0 | – | – | 0 |

FIG.4

| CONTROL SIGNAL | | S1 | S2 | S3 | S4 |
|---|---|---|---|---|---|
| TOP FIELD | 0 | 1 | 2/8 | 4/8 | 0 |
| | 1 | 0 | 1 | 2/8 | 1 |
| | 2 | 0 | – | – | 0 |
| BOTTOM FIELD | 0 | 0 | 1 | 1/8 | 1 |
| | 1 | 1 | 1/8 | 3/8 | 0 |
| | 2 | 1 | 1 | 3/8 | 0 |

FIG.5

| CONTROL SIGNAL | | S1 | S2 | S3 | S4 |
|---|---|---|---|---|---|
| TOP FIELD | 0 | 1 | 1/8 | 6/8 | 0 |
| | 1 | 0 | 1 | 1/8 | 1 |
| | 2 | 1 | 1/8 | 4/8 | 0 |
| | 3 | 0 | 1 | 3/8 | 1 |
| | 4 | 0 | – | – | 0 |
| | 5 | 0 | 4/8 | 4/8 | 1 |
| | 6 | 0 | – | – | 0 |
| | 7 | 1 | 3/8 | 4/8 | 0 |
| | 8 | 0 | 1 | 1/8 | 1 |
| BOTTOM FIELD | 0 | 0 | – | – | 0 |
| | 1 | 0 | 4/8 | 4/8 | 1 |
| | 2 | 0 | – | – | 0 |
| | 3 | 1 | 3/8 | 4/8 | 0 |
| | 4 | 0 | 1 | 1/8 | 1 |
| | 5 | 1 | 1/8 | 6/8 | 0 |
| | 6 | 0 | 1 | 1/8 | 1 |
| | 7 | 1 | 1/8 | 4/8 | 0 |
| | 8 | 0 | 1 | 3/8 | 1 |

FIG.6

| CONTROL SIGNAL | | S1 | S2 | S3 | S4 |
|---|---|---|---|---|---|
| TOP FIELD | 0 | 0 | 6/8 | 2/8 | 1 |
| BOTTOM FIELD | 0 | 0 | 2/8 | 6/8 | 1 |

APPARATUS AND METHOD FOR CONVERTING FROM PROGRESSIVE SCANNING IMAGE TO INTERLACE SCANNING IMAGE

BACKGROUND OF THE INVENTION

1. Field of the Invention

The present invention relates to an apparatus and method for converting scanning mode, and more particularly, to an apparatus and method for converting scanning mode which can simplify a configuration of a down-converter converting a HD or SD image of ATSC standard into an image signal of NTSC standard.

2. Description of the Related Art

In order to make it possible to process image signals generated by various scanning modes according to the development of an image signal processing technology in a conventional image signal processing apparatus such as a television, signals received in a receiving part must be processed after being converted into a form that the apparatus can process.

Thus, when processing by converting different signal modes, flickering is generated on a screen because each image signal does not correspond one to one according to the difference of processing time or processing mode.

Especially, when converting a signal of High Definition TV (HDTV) mode into a signal of NTSC format or CCIR656 format or 720*480 interlace mode corresponding to the modes, it is determined whether flickering occurs or not according as whether to use a line-memory by lines of a signal to be converted or not.

Thus, in order to remove flickering on a screen effectively, the number of line-memory installed in an apparatus for converting scanning mode of a receiving part must be increased.

But, in case of removing flickering on a screen by increasing the number of line-memory, the efficiency in a viewpoint of hardware drops remarkably.

SUMMARY OF THE INVENTION

In view of the foregoing, an object of the present invention is to provide an apparatus and method for converting scanning mode, which can remove flickering on a screen effectively with minimum number of line-memory, by enabling to process signals of many lines with one line-memory using an empty space of a line-memory effectively generated in converting a scanning mode by using a linear filter.

According to one aspect of the present invention to accomplish the object, an apparatus for converting an image signal of a progressive scanning mode to an image signal of an interlace scanning mode comprises a line-memory means to store a first line signal inputted at present among image signals of the progressive scanning mode and a converted first line signal selectively in response to a first control signal, a line-synthesis means outputting a converted first line signal by synthesizing the first line signal inputted at present and a previously inputted first line signal stored in the line-memory means in response to a first and a second synthesizing coefficient value, an output means outputting the converted first line signal in response to a second control signal and a control means controlling by providing the first and second control signal established in response to the number of lines of an image signal of the progressive scanning mode and to the number of lines of an image signal of an interlace scanning mode and the synthesizing coefficient value to the each means.

On the other hand, according to another aspect of the present invention, a method for converting scanning mode, which is for converting from a progressive scanning image having a first line number to an interlace scanning image having a second line number using one line-memory, comprises the steps of: establishing a control value to convert the first line number to the second line number; delaying a first line signal inputted at present among image signals of the progressive scanning mode for a predetermined time; selecting the delayed first line signal and a converted first line signal in response to the established control value; storing the selected first line signal in the line-memory; generating a converted first line signal by synthesizing a first line signal inputted at present among image signals of the progressive scanning mode and a previously inputted first line signal stored in the line-memory in response to the established control value; and outputting the generated first line signal selectively in response to the established control value.

Therefore, an apparatus and method for converting scanning mode according to the present invention can remove flickering on a screen effectively with minimum number of line-memory, by enabling to process signals of many lines with one line-memory using an empty space of a line-memory effectively required in converting scanning mode using a linear filter.

BRIEF DESCRIPTION OF THE DRAWINGS

Further objects and advantages of the present invention can be more fully understood from the following detailed description taken in conjunction with the accompanying drawings in which:

FIG. 3 is a table showing control values used in converting a 480p signal into a 480i signal according to an embodiment of the present invention.

FIG. 4 is a table showing control values used in converting a 720p signal into a 480i signal according to an embodiment of the present invention.

FIG. 5 is a table showing control values used in converting a 1080i signal into a 480i signal according to an embodiment of the present invention.

FIG. 6 is a table showing control values used in converting a 240p signal into a 480i signal according to an embodiment of the present invention.

DETAILED DESCRIPTION OF PREFERRED EMBODIMENTS

An apparatus and method for converting scanning mode according to the present invention will be described as follows with reference to the accompanying drawings.

Figure 1:
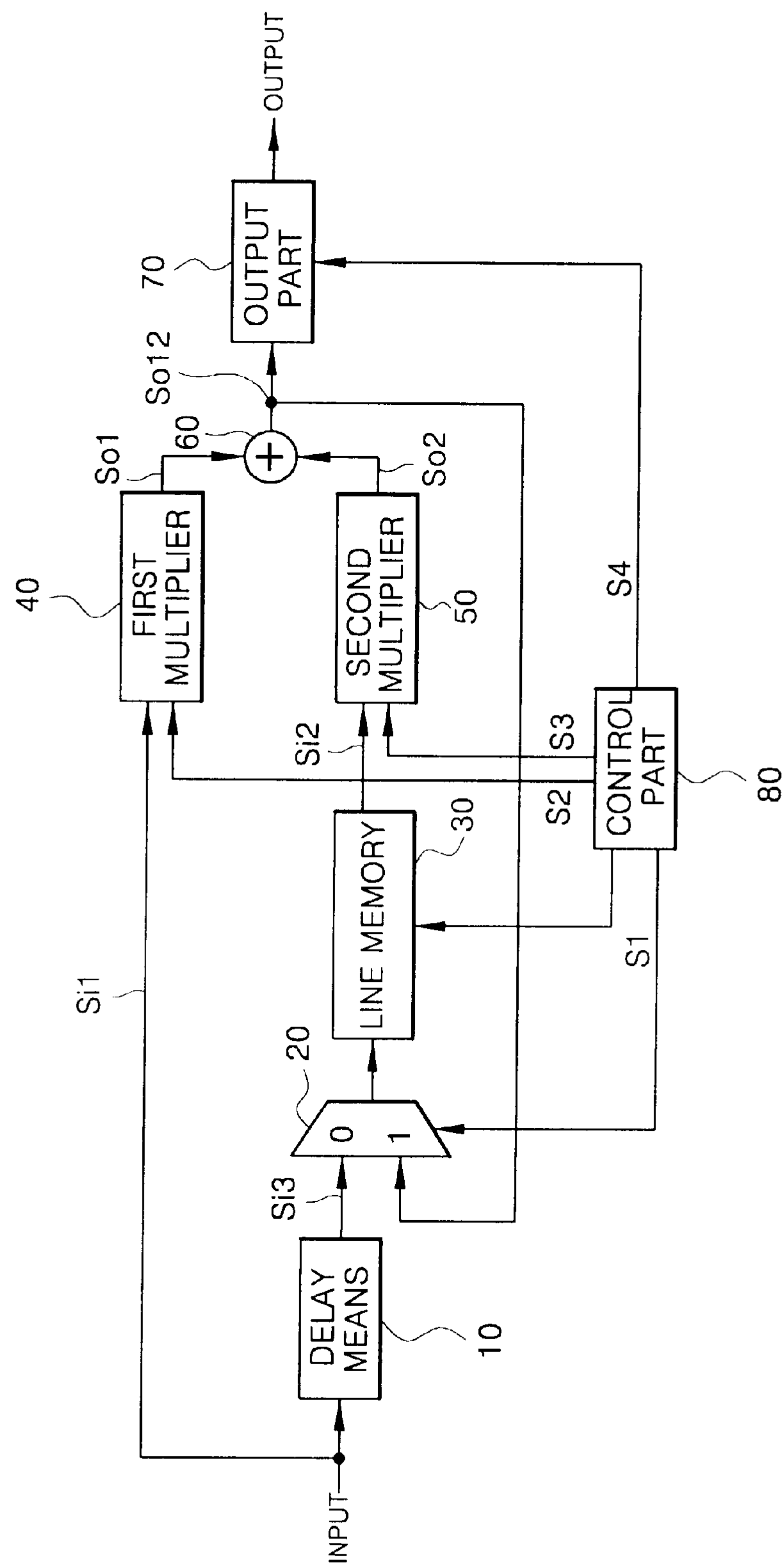
FIG. 1 is a block diagram illustrating the configuration of an apparatus for converting scanning mode according to the present invention.
Figure 2:
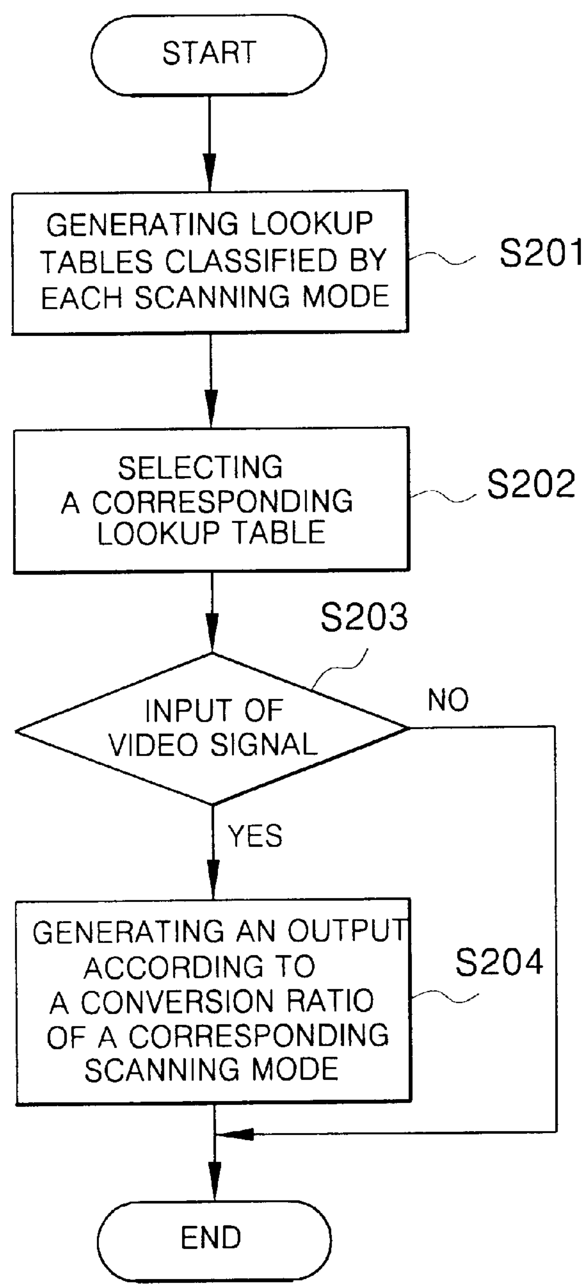
FIG. 2 is a flowchart for a method for converting scanning mode according to the present invention.

FIG. 1 is a block diagram illustrating the configuration of an apparatus for converting scanning mode according to the present invention, and FIG. 2 is a flowchart for a method for converting scanning mode according to the present invention, and FIG. 3 is a table showing coefficient values used in converting a 480p signal into a 480i signal according to an embodiment of the present invention, and FIG. 4 is a table showing coefficient values used in converting a 720p signal into a 480i signal according to an embodiment of the present invention, and FIG. 5 is a table showing coefficients values used in converting a 1080p signal into a 480i signal according to an embodiment of the present invention, and FIG. 6 is a table showing coefficient values used in converting a 240p signal into a 480i signal according to an embodiment of the present invention.

First, referring to FIG. 1, an apparatus for converting scanning mode provided by the present invention includes a line-memory means including a delay 10, a selector 20 and a line-memory 30, a line synthesis means including a first multiplier 40, a second multiplier 50 and an adder 60, an output part 70 and a control part 80.

The delay means outputs a signal Si3 by delaying an image signal of a line inputted at a time T−t before a random time for a constant time Δt.

The selector selects a delayed first line signal Si3 and a modified first line signal So12 in response to a S1 signal and provides the signals to the line-memory 30.

The line-memory 30 outputs a first line signal stored in FIFO method to a signal Si2 in response to the control of the control part 80.

The first multiplier 40 multiplies a line signal Si1 of a line inputted at a random time T by a coefficient value S3 being output from the control part 80 and outputs to a signal So1.

The second multiplier 50 outputs by multiplying a signal Si2 outputted from the line-memory 30 by a coefficient value S2 being output from the control part 80

The adder 60 outputs a modified first line signal So12 by adding output values So1 and So2 of the first multiplier 40 and the second multiplier 50.

The output part 70 outputs the result of the adder 60 to the external by a control signal S4 of the control part 80.

The control part 80 controls the whole operations of the apparatus for converting scanning mode by outputting established first and second synthesizing coefficient value S2 and S3 and first and second control signal S1 and S4.

On the other hand, referring to FIG. 2, a method for converting scanning mode of the present invention makes out S201 a lookup table in response to each line number by establishing a coefficient value and tab number enabling to extract the optimum result value when converting scanning mode in response to the number of lines of an image signal of progressive scanning mode as shown in FIG. 3 through FIG. 6. A lookup table corresponding to the corresponding line number among lookup tables made out in the process S201 is selected S202 if an image signal is selected. An output is generated S204 according to a conversion ratio of a corresponding scanning mode by synthesizing an image signal inputted at a random time T with image signals inputted at a time T−t before the random time or at a time T+t after the random time, or by synthesizing an image signal inputted at another time with the mixed signal after feedback the mixed signal, by referring to a coefficient value of a lookup table and an input/output control signal selected in the process S202 according as an image signal is inputted S203.

Referring to the FIG. 1 and FIG. 3, a series of processes converting an image signal by 480p progressive method into an image signal by 480i interlace method is described as follows.

Referring to FIG. 1 and FIG. 3,: first, if a first line signal D1 is inputted in case of top field, because a first control signal S1 controlling a selector 20 in the FIG. 3 is '0', the inputted signal Si1 is stored in a line-memory 30 through a delay means 10 and at the same time is processed by a synthesizing coefficient value S2 after being transferred to a first multiplier 40. But, the synthesizing coefficient value S2 at this time is not established, and thus an output signal So1 of the first multiplier 40 holds an input value as it is, and is not output and disregarded since a second control signal S4 controlling an output part 70 is '0'.

Continuously, in cast that a second line signal $D_2$ is inputted, because a first control signal S1 controlling the selector 20 is '0', this signal is also stored in the line-memory 30 through the delay means 10 and at the same time is transferred to the first multiplier 40 and the coefficient value S2 is multiplied. Because the synthesizing coefficient value S2 is '4/8', a value being output from the first multiplier 40 is '4/8·D2'.

On the other hand, the line-memory 30 outputs a $D_1$ value stored during previous line period, and this value is transferred to the second multiplier 50 and a second synthesizing coefficient value S3 is multiplied. That is, the value of '$4/8 \cdot D_1$' is output by the second synthesizing coefficient value S3.

Then, an adder 60 in FIG. 1 outputs a value of $4/8 \cdot D_2 + 4/8 \cdot D_1$ obtained by adding an output value $4/8 \cdot D_2$ of the first multiplier 40 and an output value $4/8 \cdot D_1$ of the second multiplier 50, and, because the second control signal S4 is '1', outputs that value to a converted line signal So12.

That is, because a conversion ratio of an image signal of 480p progressive method and an image signal of 480i interlace method is 2:1 one line of an image signal by the 480i method per two lines of an image signal by the 480p method is output. That is, one odd-numbered line of the image signal of 480i method is generated by synthesizing an odd-numbered line previously stored by being tuned to the input timing of an even-numbered line and an even-numbered line inputted at present. Therefore, if it is performed as to all of 480 lines, top field of an interlace scanning method of 240 lines is generated.

As to next 480 lines, one even-numbered line of a 480i image signal is generated by synthesizing an even-numbered line previously stored by being tuned to the input timing of an odd-numbered line and an odd-numbered line inputted at present. Therefore, if it is performed as to all of 480 lines, bottom field or even-numbered field of an interlace scanning method of 240 lines is generated.

At this time, because it starts without data stored in the line-memory 30 as to the first line in case of the bottom field, although a first control signal S4 is '1' there is no data being output at that time.

In case of FIG. 4 through FIG. 6, an output is generated according to a conversion ratio by the same method, and FIG. 4 is a lookup table showing a control value for converting a signal of 720p method into a signal of 480i method, and because a conversion ratio when a signal of 720p method is converted into a signal of 480i method is 3:1, one line of a 480i image signal is generated per three lines of a 720p image signal is generated.

But, in this case, because there is no inputted data in an initial operation, a point of time '1' of top field whose output is generated by that a first control signal S4 becomes '1', and a point of time '0' of bottom field becomes actually a fifth data $D_5$ of top field and a fourth data $D_4$ of bottom field.

That is, referring to FIG. 4, a mixed data being output from the fifth of top field is described as follows. First, in case of a point of time '2' of top field, there is no coefficient value referred in a first multiplier 40 and a second multiplier 50 and thus a third data $D_3$ is output through the first multiplier 40 as holding the value, and because there is no previously stored data in the second multiplier 50 the adder 60 outputs the third data $D_3$ as it is.

And, if a fourth data $D_4$ is inputted at a point of time '0' of the next top field, the data is transferred to a first multiplier 40 and is processed by a coefficient value S3 '4/8' at that time and '$4/8 \cdot D_4$' is output. On the other hand, because a control signal of a selector 20 is '1', a third data $D_3$ generated as an output data at a previous time '2' enters into the line-memory 30, and the data $D_3$ is processed by a coefficient value S2 '2/8' of the second multiplier 50 and '$2/8 \cdot D_3$' is output, and this value is synthesized at an adder 60 and '$4/8 \cdot D_4 + 2/8 \cdot D_3$' is stored in the line-memory 30.

And, if a fifth data $D_5$ is inputted at a next time '1' this value is output as '$2/8 \cdot D_5$' by a coefficient value '2/8' of the first multiplier 40, and because a control signal S1 of the selector 20 is '0' at this time, while the data $D_5$ is inputted to the line-memory 30 through the delay., the value of '$4/8 \cdot D_4 + 2/8 \cdot D_3$' stored in the line-memory 30 at a previous time '0' is inputted to the second multiplier 50 and is output as holding that value by a coefficient value S2 '1' and is synthesized with the output value '$2/8 \cdot D_5$' at the adder 60 and '$4/8 \cdot D_4 + 2/8 \cdot D_3 + 2/8 \cdot D_5$' is output.

According to the cases of referring to the FIG. 3 and FIG. 4, in case that the sum of coefficient values multiplied with synthesized data goes to '1', that data is output as a conversion data.

According to one embodiment of top field in case of converting a signal of 1080p method into a signal of 480i method with reference to FIG. 5, because a conversion ratio of the methods is 9:4, if input signals at this time are $D_1$~$D_g$ and output signals are $O_1$, $O_3$, $O_5$, and $O_8$, each output signal generated by the FIG. 1 is as follows.

$$O_1 = 1/8 \cdot D_9 + 6/8 \cdot D_1 + 1/8 \cdot D_2$$

$$O_3 = 1/8 \cdot D_2 + 4/8 \cdot D_3 + 3/8 \cdot D_4$$

$$O_5 = 4/8 \cdot D_5 + 4/8 \cdot D_6$$

$$O_8 = 3/8 \cdot D_7 + 4/8 \cdot D_8 + 1/8 \cdot D_9$$

On the other hand, in case of bottom field, if input signal are $D_1$~$D_9$ and output signals are $O_1$, $O_4$, $O_6$, and $O_8$ like the, each output signal generated by the FIG. 1 is as follows.

$$O_1 = 4/8 \cdot D_1 + 4/8 \cdot D_2$$

$$O_4 = 3/8 \cdot D_3 + 4/8 \cdot D_4 + 1/8 \cdot D_5$$

$$O_6 = 1/8 \cdot D_5 + 6/8 \cdot D_6 + 1/8 \cdot D_7$$

$$O_8 = 1/8 \cdot D_7 + 4/8 \cdot D_8 + 3/8 \cdot D_9$$

At this time, the sum of coefficients values of each output signal is also '1'.

Also, according to the case of converting a signal of 240p method into a signal of 480i method with reference to FIG. 6, because a conversion ratio of this time is 1:1, an output data is generated whenever each input data is generated.

That is, the first data of top/bottom field is used as a reference for generating next data, from the next data input/output data is proceeded with a ratio of 1:1.

In this case, if an output signal of top field is $O_T$ and an output signal of bottom field is $O_B$, the values are as follows.

$$O_T = 6/8 \cdot D_0 + 2/8 \cdot D_1$$

$$O_B = 2/8 \cdot D_0 + 6/8 \cdot D_1$$

Also, at this time the sum of each coefficient goes to '1'.

Therefore, an apparatus and method for converting scanning mode according to the present invention can remove flickering on a screen effectively with minimum number of line-memory, by enabling to process signals of many lines with one line-memory using an empty space of a line-memory effectively required in converting a scanning mode by using a linear filter.

While there have been illustrated and described what are considered to be preferred embodiments of the present invention, it will be understood by those skilled in the art that various changes and modifications may be made, and equivalents may be substituted for elements thereof without departing from the spirit and scope of the present invention.

What is claimed is:

1. An apparatus for converting scanning mode to convert from a progressive scanning image to an interlace scanning image, comprising:

a line-memory means to store a first line signal inputted at present among image signals of the progressive scanning mode and a converted first line signal selectively input in response to a first control signal;

a line synthesis means outputting a converted first line signal by synthesizing the first line signal inputted at present and a previously inputted first line signal stored in said line-memory means in response to a first and a second synthesizing coefficient value;

an output means outputting said converted first line signal in response to a second control signal; and a control means controlling by providing said first and second control signal established in response to the number of lines of an image signal of said progressive scanning mode and to the number of lines of an image signal of an interlace scanning mode and said first and second synthesizing coefficient values, wherein said first and second control signal, and said first and second synthesizing coefficient values-have the following values as shown in the table below when converting from a progressive scanning image signal having 480 line number to an interlace scanning image signal having 480 line number,

| CONTROL SIGNAL | | S1 | S2 | S3 | S4 |
|---|---|---|---|---|---|
| TOP FIELD | 0 | 0 | — | — | 0 |
| | 1 | 0 | 4/8 | 4/8 | 1 |
| BOTTOM | 0 | 0 | 4/8 | 4/8 | 1 |
| FIELD | 1 | 0 | — | — | 0 |

wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

2. An apparatus for converting scanning mode to convert from a progressive scanning image to an interlace scanning image, comprising:

a line-memory means to store a first line signal inputted at present among image signals of the progressive scanning mode and a converted first line signal selectively input in response to a first control signal;

a line synthesis means outputting a converted first line signal by synthesizing the first line signal inputted at present and a previously inputted first line signal stored in said line-memory means in response to a first and a second synthesizing coefficient value;

an output means outputting said converted first line signal in response to a second control signal; and a control means controlling by providing said first and second control signal established in response to the number of lines of an image signal of said progressive scanning mode and to the number of lines of an image signal of an interlace scanning mode and said first and second synthesizing coefficient values, wherein said first and second control signal, and said first and second synthesizing coefficient values have the following values as shown in the table below when converting from a progressive scanning image signal having 720 line number to an interlace scanning image signal having 480 line number, wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

3. An apparatus for converting scanning mode to convert from a progressive scanning image to an interlace scanning image, comprising:

a line-memory means to store a first line signal inputted at present among image signals of the progressive scanning mode and a converted first line signal selectively input in response to a first control signal;

a line synthesis means outputting a converted first line signal by synthesizing the first line signal inputted at present and a previously inputted first line signal stored in said line-memory means in response to first and a second synthesizing coefficient value; an outputting said converted first line signal in response to a second control signal; and a control means controlling by providing said first and second control signal established in response to the number of lines of an image signal of said progressive scanning mode and to the number of the lines image signal of an interlace scanning mode and said first and second synthesizing coefficient values, wherein said first and second control signal, and said first and second synthesizing coefficient values have the following values as shown in the following table when converting from a progressive scanning image signal having 1080 line number to an interlace scanning image signal having 480 line number,

| CONTROL SIGNAL | | S1 | S2 | S3 | S4 |
|---|---|---|---|---|---|
| TOP FIELD | 0 | 1 | 1/8 | 6/8 | 0 |
| | 1 | 0 | 1 | 1/8 | 1 |
| | 2 | 1 | 1/8 | 4/8 | 0 |
| | 3 | 0 | 1 | 3/8 | 1 |
| | 4 | 0 | — | — | 0 |
| | 5 | 0 | 4/8 | 4/8 | 1 |
| | 6 | 0 | — | — | 0 |
| | 7 | 1 | 3/8 | 4/8 | 0 |
| | 8 | 0 | 1 | 1/8 | 1 |
| BOTTOM FIELD | 0 | 0 | — | — | 0 |
| | 1 | 0 | 4/8 | 4/8 | 1 |
| | 2 | 0 | — | — | 0 |
| | 3 | 1 | 3/8 | 4/8 | 0 |
| | 4 | 0 | 1 | 1/8 | 1 |
| | 5 | 1 | 1/8 | 6/8 | 0 |
| | 6 | 0 | 1 | 1/8 | 1 |
| | 7 | 1 | 1/8 | 4/8 | 0 |
| | 8 | 0 | 1 | 3/8 | 1 |

wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

4. An apparatus for converting scanning mode to convert from a progressive scanning image to an interlace scanning image, comprising: a line-memory means to store a first line signal inputted at present among image signals of the progressive scanning mode and a converted first line signal selectively input in response to a first control signal;

a line synthesis means outputting a converted first line signal by synthesizing the first line signal inputted at present and a previously inputted first line signal stored in said line-memory means in response to a first and a second synthesizing coefficient value;

an output means outputting said converted first line signal in response to a second control signal; and a control means controlling by providing said first and second control signal established in response to the number of lines of an image signal of said Progressive scanning mode and to the number of lines of an image signal of an interlace scanning mode and said first and second synthesizing coefficient values, wherein said first and second control signal, and said first and second synthesizing coefficient values have the following values as shown in the table below when converting from a progressive scanning image signal having 240 line number to an interlace scanning image signal having 480 line number,

| CONTROL SIGNAL | | S1 | S2 | S3 | S4 |
|---|---|---|---|---|---|
| TOP FIELD | 0 | 0 | 6/8 | 2/8 | 1 |
| BOTTOM FIELD | 0 | 0 | 2/8 | 6/8 | 1 |

wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

5. A method for converting scanning mode to convert from a progressive scanning image having a first line number to an interlace scanning image having a second line number using one line-memory, comprises the steps of:

establishing a control value to convert said first line number to said second line number;

delaying a first line signal inputted at present among image signals of said progressive scanning mode for a fixed time;

selecting said delayed first line signal and a converted first line signal in response to said established control value;

storing said selected first line signal in said line-memory;

generating a converted first line signal by synthesizing a first line signal inputted at present among image signals of said progressive scanning mode and a previously inputted first line signal stored in said line-memory in response to said established control value: and outputting said generated first line signal selectively in response to said established control value, wherein established control value has the following values as shown in the table below when converting from a progressive scanning image signal having 480 line number to an interlace scanning image signal having 480 line number,

| CONTROL SIGNAL | | S1 | S2 | S3 | S4 |
|---|---|---|---|---|---|
| TOP FIELD | 0 | 0 | — | — | 0 |
| | 1 | 0 | 4/8 | 4/8 | 1 |
| BOTTOM FIELD | 0 | 0 | 4/8 | 4/8 | 1 |
| | 1 | 0 | — | — | 0 |

wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

6. A method for converting scanning mode to convert from a progressive scanning image having a first line number to an interlace scanning image having a second line number using one line-memory, comprises the steps of:

establishing a control value to convert said first line number to said second line number;

delaying a first line signal inputted at present among image signals of said progressive scanning mode for fixed time;

selecting said delayed first line signal and a converted first line signal in response to said established control value;

storing said selected first line signal in said line-memory;

generating a converted first line signal by synthesizing a first line signal inputted at present among image signals of said progressive scanning mode and a previously inputted first line signal stored in said line-memory in response to said established control value, and outputting said generated first line signal selectively in response to said established control value, wherein established control value has the following values as shown in the table below when converting from progressive scanning image signal having 720 line number to an interlace scanning image signal having 480 line number,

| CONTROL SIGNAL | | S1 | S2 | S3 | S4 |
|---|---|---|---|---|---|
| TOP FIELD | 0 | 1 | 2/8 | 4/8 | 0 |
| | 1 | 0 | 1 | 2/8 | 1 |
| | 2 | 0 | — | — | 0 |
| BOTTOM FIELD | 0 | 0 | 1 | 1/8 | 1 |
| | 1 | 1 | 1/8 | 3/8 | 0 |
| | 2 | 1 | 1 | 3/8 | 0 |

wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

7. A method for converting scanning mode to convert from a progressive scanning image having a first line number to an interlace scanning image having a second line number using one line-memory, comprises the steps of:

establishing a control value to convert said first line number to said second line number;

delaying a first line signal inputted at present among image signals of said progressive scanning mode for a fixed time;

selecting said delayed first line signal and a converted first line signal in response to said established control value;

storing said selected first line signal in said line-memory;

generating a converted first line signal by synthesizing a first line signal inputted at present among image signals of said progressive scanning mode and a previously inputted first line signal stored in said line-memory in response to said established control value; and outputting said generated first line signal selectively in response to said established control value, wherein established control value has the following values as shown in the table below when converting from a progressive scanning image signal having 1080 line number to an interlace scanning image signal having 480 line number,

| CONTROL SIGNAL | | S1 | S2 | S3 | S4 |
|---|---|---|---|---|---|
| TOP FIELD | 0 | 1 | 1/8 | 6/8 | 0 |
| | 1 | 0 | 1 | 1/8 | 1 |
| | 2 | 1 | 1/8 | 4/8 | 0 |
| | 3 | 0 | 1 | 3/8 | 1 |
| | 4 | 0 | — | — | 0 |
| | 5 | 0 | 4/8 | 4/8 | 1 |
| | 6 | 0 | — | — | 0 |
| | 7 | 1 | 3/8 | 4/8 | 0 |
| | 8 | 0 | 1 | 1/8 | 1 |
| BOTTOM FIELD | 0 | 0 | — | — | 0 |
| | 1 | 0 | 4/8 | 4/8 | 1 |
| | 2 | 0 | — | — | 0 |
| | 3 | 1 | 3/8 | 4/8 | 0 |
| | 4 | 0 | 1 | 1/8 | 1 |
| | 5 | 1 | 1/8 | 6/8 | 0 |
| | 6 | 0 | 1 | 1/8 | 1 |
| | 7 | 1 | 1/8 | 4/8 | 0 |
| | 8 | 0 | 1 | 3/8 | 1 |

wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

8. A method for converting scanning mode to convert from a progressive scanning image having a first line number to an interlace scanning image having a second line number using one line-memory, comprises the steps of:

establishing a control value to convert said first line number to said second line number;

delaying a first line signal inputted at present among image signals of said progressive scanning mode for a fixed time;

selecting said delayed first line signal and a converted first line signal in response to said established control value;

storing said selected first line signal in said line-memory;

generating a converted first line signal by synthesizing a first line signal inputted at present among image signals of said progressive scanning mode and a previously inputted first line signal stored in said line-memory in response to said established control value; and outputting said generated first line signal selectively in response to said established control value, wherein established control value has the following values as shown in the table below when converting from a progressive scanning image signal having 240 line number to an interlace scanning image signal having 480 line number,

| CONTROL SIGNAL | | S1 | S2 | S3 | S4 |
|---|---|---|---|---|---|
| TOP FIELD | 0 | 0 | 6/8 | 2/8 | 1 |
| BOTTOM FIELD | 0 | 0 | 2/8 | 6/8 | 1 |

wherein S1 is a control signal to select a line-memory input signal with a first control signal, and S2 is a synthesizing coefficient value of a first line signal inputted at present, and S3 is a synthesizing coefficient value of a previous first line signal stored in a line-memory, and S4 is a control signal to select an output of a modified first line signal.

* * * * *